US007333937B2

(12) United States Patent
Baldwin, Jr. et al.

(10) Patent No.: US 7,333,937 B2
(45) Date of Patent: Feb. 19, 2008

(54) HEALTH CARE FINANCING METHOD

(75) Inventors: Byron S. Baldwin, Jr., Lincolnton, GA (US); Phillip Dolamore, Plantation, FL (US); Thomas Mahaney, Fort Lauderdale, FL (US)

(73) Assignee: ADS ResponseCorp, Inc., Fort Lauderdale, FL (US)

( * ) Notice: Subject to any disclaimer, the term of this patent is extended or adjusted under 35 U.S.C. 154(b) by 1056 days.

(21) Appl. No.: 09/951,962

(22) Filed: Sep. 13, 2001

(65) Prior Publication Data

US 2003/0050796 A1   Mar. 13, 2003

(51) Int. Cl.
 *G06Q 50/00*   (2006.01)
(52) U.S. Cl. .................. 705/2; 705/3; 705/4; 705/35; 705/38; 705/39
(58) Field of Classification Search .............. 705/2, 705/3, 35, 38, 4, 39
See application file for complete search history.

(56) References Cited

U.S. PATENT DOCUMENTS

| | | | |
|---|---|---|---|
| 4,491,725 A | 1/1985 | Pritchard | |
| 4,667,292 A | 5/1987 | Mohlenbrock et al. | |
| 5,018,067 A | 5/1991 | Mohlenbrock et al. | |
| 5,301,105 A | 4/1994 | Cummings, Jr. | |
| 5,359,509 A | 10/1994 | Little et al. | |
| 5,550,734 A | 8/1996 | Tarter et al. | 705/2 |
| 5,583,760 A * | 12/1996 | Klesse | 705/38 |
| 5,644,778 A | 7/1997 | Burks et al. | |
| 5,699,527 A * | 12/1997 | Davidson | 705/38 |
| 5,704,044 A | 12/1997 | Tarter et al. | |
| 5,748,907 A | 5/1998 | Crane | |
| 5,809,478 A * | 9/1998 | Greco et al. | 705/4 |
| 5,832,447 A | 11/1998 | Rieker et al. | |
| 6,012,035 A | 1/2000 | Freeman, Jr. et al. | 705/2 |
| 6,061,657 A | 5/2000 | Whiting-O'Keefe | 705/2 |
| 6,067,522 A | 5/2000 | Warady et al. | 705/2 |
| 6,073,104 A | 6/2000 | Field | |
| 6,112,183 A | 8/2000 | Swanson et al. | |
| 6,148,297 A | 11/2000 | Swor et al. | |
| 6,208,973 B1 | 3/2001 | Boyer et al. | |

(Continued)

OTHER PUBLICATIONS

Arizona Business Gazette, "Tobacco-Tax Funds to Pay for AIDS Drugs," Oct. 2, 1997, p. 19.*

*Primary Examiner*—Jeffrey A. Smith
*Assistant Examiner*—Lena Najarian
(74) *Attorney, Agent, or Firm*—Greenberg Traurig, LLP

(57) ABSTRACT

A computer implemented method for determining eligibility of a patient to receive financial assistance. The method utilizes health care financial assistance information associated with at least a first potential health care financial assistance plan and a second potential health care financial assistance plan, wherein the patient is not enrolled in either of the first or second potential health care financial assistance plans at the time of the determination of the eligibility, wherein the first potential health care financial assistance plan is provided by a first health care financial assistance plan provider, wherein the second potential health care financial assistance plan is provided by a second health care financial assistance plan provider, wherein the health care financial assistance information associated with the first potential health care financial assistance plan includes first provider qualification criteria and wherein the health care financial assistance information associated with the second potential health care financial assistance plan includes second provider qualification criteria. A system for financing health care is also disclosed.

14 Claims, 2 Drawing Sheets

U.S. PATENT DOCUMENTS

| | | |
|---|---|---|
| 6,453,297 B1 | 9/2002 | Burks et al. |
| 6,542,905 B1* | 4/2003 | Fogel et al. .................. 707/200 |
| 2001/0021910 A1* | 9/2001 | Goldstein ......................... 705/2 |
| 2001/0034618 A1 | 10/2001 | Kessler et al. |
| 2001/0037218 A1* | 11/2001 | Kaker et al. ..................... 705/2 |
| 2001/0037288 A1* | 11/2001 | Bennett et al. ................ 705/38 |
| 2001/0041990 A1 | 11/2001 | Javitt |
| 2001/0044765 A1* | 11/2001 | Wolberg ......................... 705/35 |
| 2001/0047325 A1* | 11/2001 | Livingston .................... 705/38 |
| 2002/0028426 A1* | 3/2002 | Pasant ........................... 434/118 |
| 2002/0082863 A1 | 6/2002 | Kleinke |
| 2002/0107849 A1* | 8/2002 | Hickey et al. ................... 707/3 |
| 2002/0116308 A1* | 8/2002 | Cunningham ................. 705/35 |
| 2002/0120538 A1* | 8/2002 | Corrie et al. .................. 705/35 |
| 2002/0172911 A1* | 11/2002 | Cooper .......................... 433/24 |
| 2003/0023544 A1* | 1/2003 | Chodes .......................... 705/38 |
| 2003/0036926 A1* | 2/2003 | Starkey et al. ................... 705/3 |

* cited by examiner

HEALTH CARE FINANCING METHOD

BACKGROUND OF THE INVENTION

1. Field of the Invention

The present invention relates to the field of health care billing systems, and more particularly to financing health care treatment.

2. Background of the Invention

Current methods employed by health care organizations in the qualification of applicants for health care financial assistance generally include the manual interpretation of demographic, health care and financial data. The interpretation of such data can include the comparison of the data with written guidelines provided by public and private agencies offering health care financial assistance through grants, tax fund programs, and government programs such as Medicaid and Medicare. Additionally, many health care financial assistance programs require the interpretation of financial data, such as those obtainable through conventional credit reporting, as part of the grant process. Still, the interpretive result can be characterized as having less than desirable accuracy.

Public and private financial assistance programs, of which there can be dozens at any time, have proven helpful in defraying some expenses experienced by health care providers in providing health care services to individuals of less than adequate means. The suitability of individual assistance programs, however, can vary depending upon the demographic, health care and financial data of each patient. Yet, identifying suitable financial assistance programs can be difficult in view both of the changing number and type of financial assistance programs, and the inaccuracies associated with interpreting the demographic, health care and financial data. In many cases, the successful identification of suitable assistance programs can depend on the experience, training and knowledge of individual admitting and billing clerks employed by the health care provider.

SUMMARY OF THE INVENTION

A method for financing health care includes the steps of: receiving patient data in a data processing system; collecting from disparate health care grant systems health care grant information into a single database; identifying qualification criteria in the health care grant information; and, comparing the patient data to the qualification criteria and, if the patient data satisfies the criteria, creating a notification that the criteria have been met. The patient data can include at least one of credit data, insurance data, and income data. The health care grant information can include qualification criteria. The health care grant system can be any suitable system, for example, Medicaid.

The single database can be accessed by the data processing system through an internet connection. The health care grant information can be collected from the health care grant systems by accessing the systems and querying for such information, and such queries and responsive data can also be transmitted through an internet connection. The health care grant information can also be collected from the health care grant systems by receiving information transmitted by the health care grant systems, as in periodic or intermittent updates.

The health care grant information can include health care grant amounts, and the method can further comprise the step of obtaining such health care grant amounts for health care grant systems which have criteria which have been satisfied by the patient data. The grant amount can be compared to the health care costs of the patient. Financing can be obtained for any portion of the health care costs of the patient in excess of the grant amount. A health care grant application can be provided for the health care grant system for which the criteria have been satisfied.

A system for obtaining health care financing includes a data processing system adapted to receive patient data and a single database having stored therein the health care grant information of a plurality of disparate health care grant systems. The data processing system is adapted to identify qualification criteria in the health care grant information, to compare the patient data to the qualification criteria and, if the patient data satisfies the criteria, to create a notification that the criteria have been met.

The data processing system can comprise structure for collecting the health care grant information from the health care grant systems by accessing the systems and querying for the information. The data processing system can comprise structure for collecting the health care grant information from the health care grant systems by receiving information transmitted by the health care grant systems, as in regular or intermittent updates.

The health care grant information can include health care grant amounts, and the system of the invention can obtain the grant amounts for the health care grant systems which have criteria which have been satisfied by the patient data. The system further can comprise structure for comparing the grant amounts to health care costs for the patient, and for obtaining financing for any portion of the health care costs of the patient in excess of the amount of the grant. The system can provide a health care grant application for the health care grant system for which the criteria have been satisfied.

A machine readable storage according to the invention has stored thereon a computer program for financing health care. The computer program has a plurality of code sections executable by a machine for causing the machine to perform the steps of: receiving patient data in a data processing system; collecting from disparate health care grant systems health care grant information into a single database; identifying qualification criteria in the health care grant information; comparing the patient data to the qualification criteria and, if the patient data satisfies the criteria, creating a notification that the criteria have been met.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENT

Figure 1:
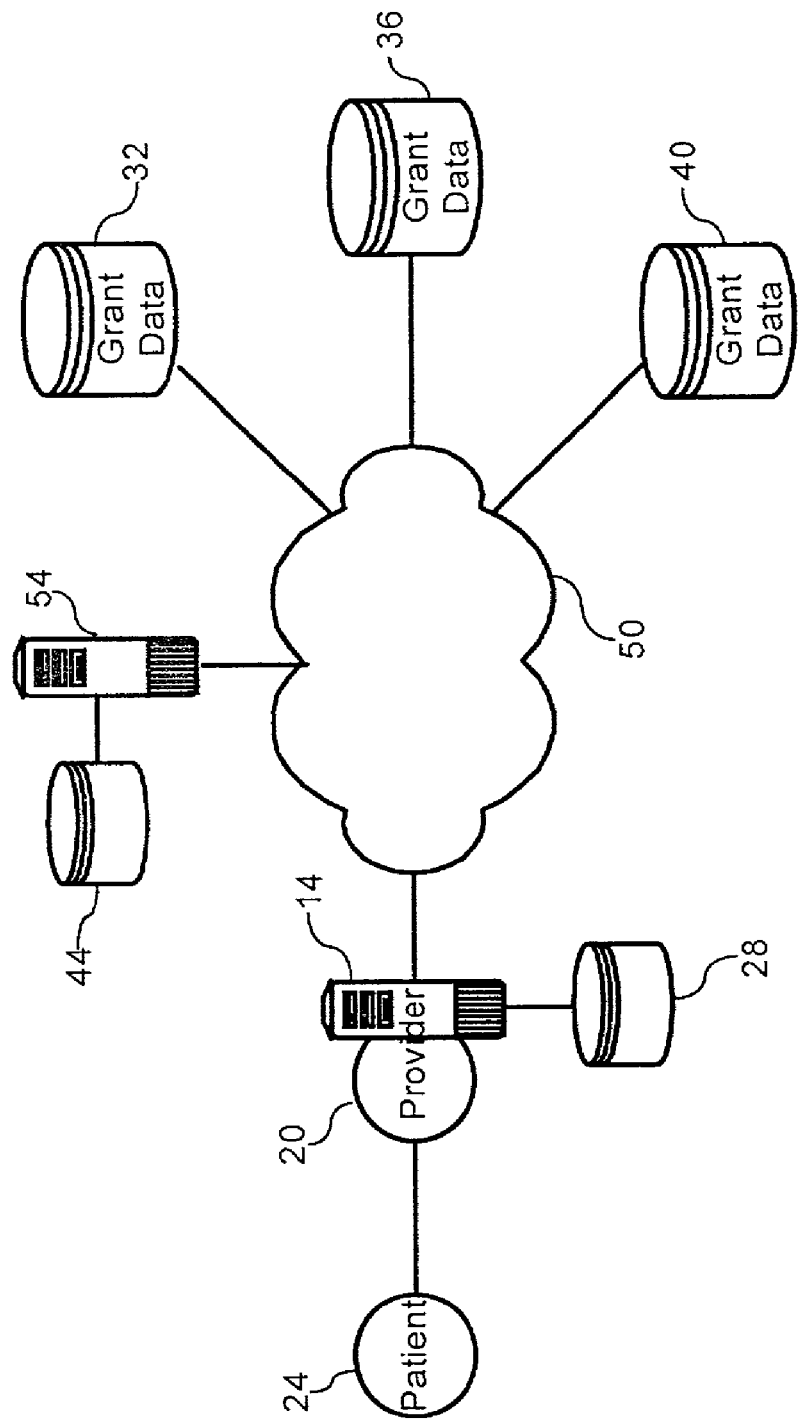
FIG. 1 is a schematic diagram of a health care financing system according to the invention; and, FIG. 2 is a flow diagram of a health care financing method according to the invention.

The present invention is a health care financing system in which health care grant information can be analyzed to determine whether a patient qualifies for a health care grant. A health care financing system according to the invention is shown in FIG. 1. In the health care financing system of the present invention, a data processing system 14 is adapted to receive patient data. The data processing system 14 will typically be operated by a health care provider 20, although it is possible that the data processing system 14 could be operated by the patient 24 or by another person or entity. In one aspect of the invention, the data processing system 14 includes a database 28.

Health care grant systems maintain health care grant information in respective health care grant system databases 32, 36 and 40. Although the illustrated embodiment includes three health care grant systems, it will be apparent that any number of health care grant systems and health care grant system databases are possible. The health care grant systems can be selected from any suitable system which tracks programs which offer financial assistance to patients meeting qualification criteria. Such programs can include public programs such as Medicare and Medicaid, WAGES, TANF, and WIC programs, as well as private programs such as foundations and for-profit and not-for-profit entities offering health care financial assistance for qualifying applicants.

Health care grant information retrieved from the health care systems 32, 36 and 40 can be stored in a single database. The database can be associated with the health care provider 20, as shown by the database 28. It is also possible, however, that the database is located remotely from the health care provider 20 as indicated by the database 44. The remote database 44 can have an associated data processing system 54. Access to the remote database 44 can be accomplished by any suitable methodology. In one aspect, access to the remote database 44 is accomplished through the Internet 50.

The data processing system 54 can query health care grant systems 32, 36 and 40 for health care grant information. The responses including the health care grant information can be stored in the remote database 44 or in the database 28 of the health care provider 20. In another aspect, the health care grant systems update the databases with current health care grant information. These updates can be periodic, and can be performed so as to regularly update the database 28 or 44 with health care grant information. The updates can also be intermittent, such as whenever there is information to be updated or when a given amount of new information is available for update. The transmission of the health care grant information and the queries can be transmitted over a suitable network medium such as the Internet 50.

The patient data can include any suitable data useful or necessary for applying for or qualifying for health care grants. For instance, the patient data can include credit data. Also, the patient data can include insurance data. Finally, the patient data can further include income data. Typically, when applying for Medicare and Medicaid, an asset test is performed to determine financial aid eligibility. In the present invention, a credit report can be used in lieu of such asset test. Still, these examples are not intended to be limiting and are only exemplary of possible patient data. In particular, as is known in the art, such patient data information typically is used by health care grant systems to make decisions as to health care grant qualifications which can be utilized.

Qualification criteria can be identified in the health care grant information. This identification can be performed by a local data processing system 14 or by a remote data processing system 54. In either case, the qualification criteria are compared to the patient data to determine if the patient data satisfies the criteria. This comparison can be performed by a local data processing system 14 or by a remote data processing system 54. For example, in one aspect of the invention, the qualification criteria can include a debt to income ratio. In particular, the debt to income ratio can be computed as an adjustable, programmable, benchmark for automatic approval or denials for financial aid.

The health care grant information that is obtained can include health care grant amounts for the health care grant systems. These amounts can then be compared with the amount of health care costs for the patient, to determine the balance to be paid by the patient. Arrangements can then be made to obtain financing for all or some portion of the health care costs of the patient that are in excess of the grant amount.

Upon determining that the patient data satisfies the qualification criteria, a notification is created to identify that a grant can be obtained. This notification can be in the form of letter or e-mail correspondence identifying the particular grant, the grant amount, and any necessary application data. In one aspect, the notification includes a printout or electronic form for applying for the grant. The patient 24 or health care provider 20, or another third party, can then make application for the grant. Prompt application for the grant is beneficial as grants can expire, grant amounts can change, and patient data can change with time.

Figure 2:
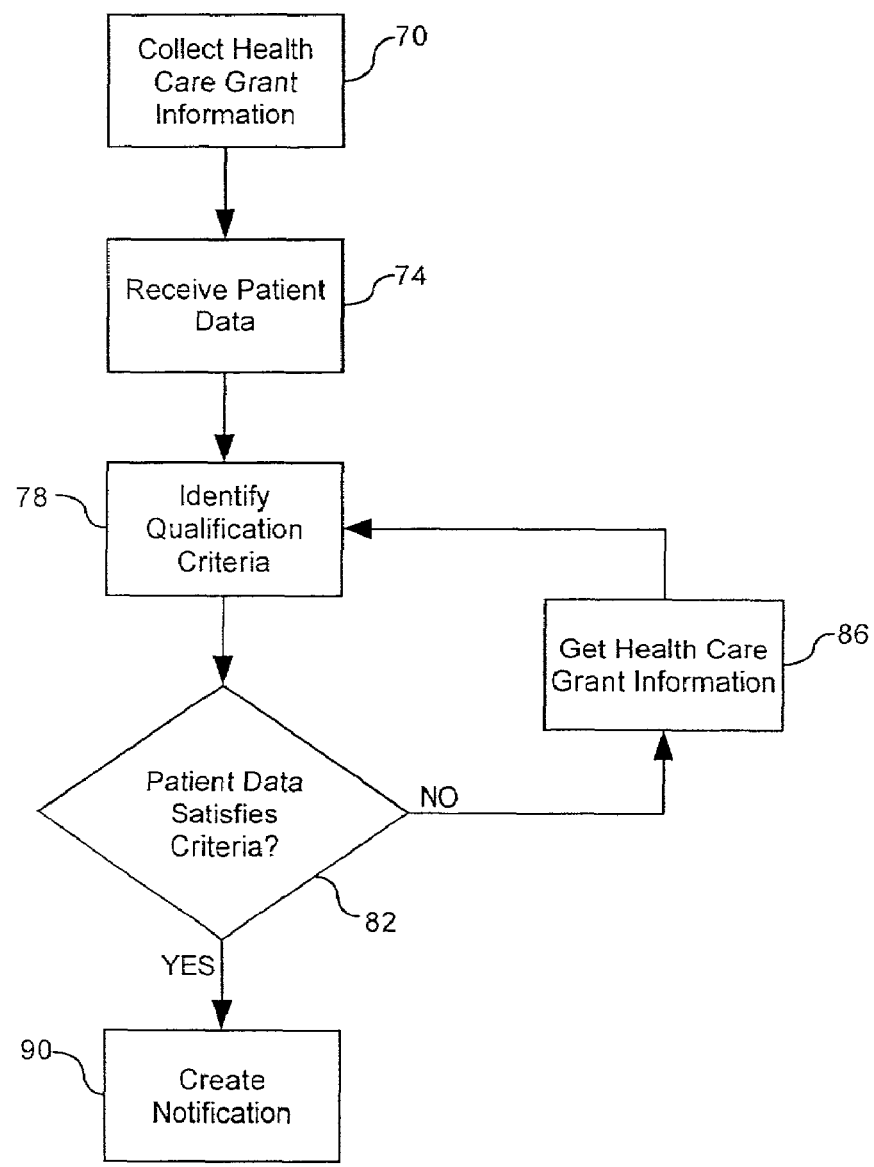

A flow diagram illustrating the method of the invention is shown in FIG. 2. The method begins with step 70, wherein health care grant information is collected into a single database. Patient data is received in step 74. The patient data can be used as part of the financial aid application process. Notably, in step 74 a phone number of the patient can be acquired. Subsequently, an automatic reverse telephone number lookup can be performed in order to verify residence information included as part of the financial aid process.

Qualification criteria is identified in step 78. In step 82 the qualification criteria is compared to the patient data and it is determined if the patient data satisfies the qualification criteria. If not, the method cycles through a path 86 to compare the patient data qualification criteria from another health care grant system, whereupon the qualification criteria is again identified in step 78. If the patient data satisfies the criteria, a notification is created in step 90.

The invention also comprises a machine readable storage having stored thereon a computer program for financing health care. The computer program has a plurality of code sections executable by a machine for causing the machine to perform the steps of receiving patient data in a data processing system; collecting from disparate health care grant systems health care grant information into a single database; identifying qualification criteria in the health care grant information; comparing the patient data to the qualification criteria and, if the patient data satisfies the criteria, creating a notification that the criteria have been met.

This invention can be embodied in other forms without departing from the spirit or essential attributes thereof, and accordingly, reference should be had to the following claims, rather than the foregoing specification, as indicating the scope of the invention.

We claim:

1. A computer implemented method for determining eligibility of a patient to receive health care financial assistance, comprising the steps of:

collecting health care financial assistance information, wherein the health care financial assistance information is associated with at least a first potential health care financial assistance plan and a second potential health care financial assistance plan, wherein the patient is not enrolled in either of the first or second potential health care financial assistance plans at the time of the determination of the eligibility, wherein the first potential health care financial assistance plan is provided by a first health care financial assistance plan provider, wherein the second potential health care financial assistance plan is provided by a second health care financial assistance plan provider, wherein first provider qualification criteria is established by the first health care financial assistance plan provider, wherein the health care financial assistance information associated with the first potential health care financial assistance plan includes the first provider qualification criteria, wherein second provider qualification criteria is established by the second health care financial assistance plan provider, and wherein the health care financial assistance information associated with the second potential health care financial assistance plan includes the second provider qualification criteria;

populating at least one database with at least a portion of the first provider qualification criteria and at least a portion of the second provider qualification criteria;

inputting patient data associated with the patient, wherein the patient data is used for applying for health care financial assistance;

inputting credit information derived from a credit report of the patient, extracting at least a portion of the credit information and combining the extracted credit information with at least a portion of the patient data to form patient data with corresponding credit information;

identifying at least a portion of the first provider qualification criteria in the database and at least a portion of the second provider qualification criteria in the database;

comparing at least a portion of the patient data with corresponding credit information to at least the following: i) the identified first provider qualification criteria; and ii) the identified second provider qualification criteria;

determining if the comparison satisfies at least one of the identified first provider qualification criteria or the identified second provider qualification criteria;

creating a notification if the comparison determines that at least a portion of the patient data with corresponding credit information satisfies the identified first provider qualification criteria, such that the patient's eligibility to receive financial assistance under the first potential health care financial assistance plan is made known by the notification; and creating a notification if the comparison determines that at least a portion of the patient data with corresponding credit information satisfies the identified second provider qualification criteria, such that the patient's eligibility to receive financial assistance under the second potential health care financial assistance plan is made known by the notification;

wherein the potential health care financial assistance, indicated in the notification, defrays at least a portion of an associated expense incurred by the patient.

2. The method of claim 1, wherein said patient data comprises insurance data.

3. The method of claim 1, wherein said patient data comprises income data.

4. The method of claim 1, wherein said database is accessed over the Internet.

5. The method of claim 1, wherein said health care financial assistance information is collected from at least one health care system by accessing said health care system.

6. The method of claim 1, wherein said health care financial assistance information is collected from at least one health care system by receiving information transmitted by said health care system.

7. The method of claim 1, wherein at least one of said first and second health care financial assistance plan providers is Medicaid.

8. The method of claim 1, wherein said health care financial assistance information includes at least one health care assistance amount.

9. The method of claim 8, further comprising the step of obtaining financing for any portion of the health care costs for said patient in excess of said assistance amount.

10. The method of claim 1, wherein at least one of the first and second potential health care financial assistance plans is a grant.

11. The method of claim 1, wherein at least one of the first and second potential health care financial assistance plans is a tax fund program.

12. The method of claim 1, wherein at least one of the first and second potential health care financial assistance plans is a government program.

13. The method of claim 1, wherein a debt to income ratio is calculated based on the credit information and wherein the patient data with corresponding credit information comprises the debt to income ratio.

14. The method of claim 1, wherein the extracted credit information is used in lieu of an asset test.

* * * * *

(12) POST-GRANT REVIEW CERTIFICATE (7th)
United States Patent
Baldwin, Jr. et al.

(10) Number: US 7,333,937 J1
(45) Certificate Issued: Sep. 16, 2015

(54) HEALTH CARE FINANCING SYSTEM AND METHOD

(75) Inventors: Byron S. Baldwin, Jr.; Phillip Dolamore; Thomas Mahaney

(73) Assignee: TRANSUNION INTELLIGENCE LLC

Trial Number:

CBM2013-00037 filed Jul. 29, 2013

Petitioner: Search America, Inc.

Patent Owner: Transunion Intelligence LLC

Post-Grant Review Certificate for:

Patent No.: 7,333,937
Issued: Feb. 19, 2008
Appl. No.: 09/951,962
Filed: Sep. 13, 2001

The results of CBM2013-00037 are reflected in this post-grant review certificate under 35 U.S.C. 328(b).

POST-GRANT REVIEW CERTIFICATE
U.S. Patent 7,333,937 J1
Trial No. CBM2013-00037
Certificate Issued Sep. 16, 2015

AS A RESULT OF THE POST-GRANT REVIEW PROCEEDING, IT HAS BEEN DETERMINED THAT:

Claims 1-14 are cancelled.

* * * * *